United States Patent [19]

Henderson

[11] Patent Number: 4,595,385
[45] Date of Patent: Jun. 17, 1986

[54] BELT CONSTRUCTION, TRANSVERSE BELT ELEMENT THEREFOR AND METHOD OF MAKING THE SAME

[75] Inventor: Dewey D. Henderson, Springfield, Mo.

[73] Assignee: Dayco Corporation, Dayton, Ohio

[21] Appl. No.: 592,773

[22] Filed: Mar. 26, 1984

[51] Int. Cl.⁴ ............................ F16G 1/00; F16G 1/21
[52] U.S. Cl. ..................................... 474/201; 474/242; 474/245
[58] Field of Search ............... 474/201, 205, 242, 244, 474/245

[56] References Cited

U.S. PATENT DOCUMENTS 2,663,194 12/1953 Ogard .................................. 474/242
4,080,841 3/1978 Vollers ............................... 474/201
4,177,687 12/1979 Russ, Sr. ............................ 474/242
4,193,312 3/1980 Cicognani .......................... 474/242
4,424,049 1/1984 Braybrook ......................... 474/201

FOREIGN PATENT DOCUMENTS

792144 12/1935 France ................................ 474/242
256918 9/1948 Switzerland .

Primary Examiner—James A. Leppink
Assistant Examiner—Frank McKenzie
Attorney, Agent, or Firm—Joseph V. Tassone

[57] ABSTRACT

An endless power transmission belt construction and a transverse belt element therefor as well as a method of making the same are provided, the belt construction comprising an endless carrier unit and a plurality of transverse belt elements assembled on the carrier unit, each belt element comprising a block of polymeric material having a reinforcing member of metallic material disposed therein. Each reinforcing member comprises a folded blank defining two spaced apart side parts that extend outboard of one of the surfaces of the carrier unit and an elbow joining the side parts together and extending outboard of the other of the surfaces of the carrier unit. Each belt element has a slot receiving the carrier unit therein and a shoulder arrangement that defines part of the slot and engages the inner surface of the carrier. The side parts of each reinforcing member of each belt element define the shoulder arrangement of their respective belt element.

51 Claims, 21 Drawing Figures

BELT CONSTRUCTION, TRANSVERSE BELT ELEMENT THEREFOR AND METHOD OF MAKING THE SAME

BACKGROUND OF THE INVENTION

1. Field of the Invention

This invention relates to an improved endless power transmission belt construction and to a transverse belt element therefor as well as to a method of making such a belt construction.

2. Prior Art Statement

It is known to provide an endless power transmission belt construction comprising an endless carrier means having an inner surface means and an outer surface means, and a plurality of transverse belt elements assembled on the carrier means, each belt element comprising a block of polymeric material having a reinforcing member of metallic material disposed therein. For example, see the U.S. Pat. No. 4,177,687 to Russ, Sr., and the U.S. Pat. No. 2,663,194, to Ogard.

It is also known to provide a transverse belt element comprising a folded blank defining two spaced apart side parts that extend below the inner surface means of a carrier means and an elbow means joining the side parts together and extending above the outer surface means of the carrier means. The belt element has a slot means receiving the carrier means therein and a shoulder means that defines part of the slot means and engages the inner surface means of the carrier means, the side parts of the belt element defining the shoulder means thereof. The elbow means of the belt element comprises two spaced apart elbow portions disposed on opposite sides of the slot means thereof. The belt element has a pin provided with opposed ends respectively received in the elbow portions thereof and extending across the carrier means adjacent the outer surface means thereof. For example, see Swiss Patent No. 256,918. Also see the U.S. Pat. No. 4,080,841 to Vollers, for the use of a transverse pin with a transverse belt element.

It is also known to interconnect a transverse belt element to a carrier means by having a pair of flanges of the belt element either received in the recess between two spaced apart projections or teeth on the inner surface means of the carrier means or receiving one of those projections or teeth between the flanges to interconnect the belt element to the carrier means. For example, see the U.S. Pat. No. 4,193,312 to Cicognani.

It is also known to fold a blank of material to form a belt element wherein the same has the shoulder means that engages against the inner surface means of the carrier means comprise turned-in flanges of the side parts of the belt element. For example, see the U.S. Pat. No. 4,424,049 to Braybrook.

It is also known to provide an endless power transmission belt construction comprising an endless carrier means having an inner surface means and an outer surface means, and a plurality of transverse belt elements assembled on the carrier means, each belt element comprising a block of polymeric material having a reinforcing member of metallic material disposed therein, each reinforcing member comprising a folded blank defining two spaced apart side parts that extend outboard of one of the surface means of the carrier means and an elbow means joining the side parts together and extending outboard of the other of the surface means of the carrier means, each belt element having a slot means receiving the carrier means therein and a shoulder means that defines part of the slot means and engages the inner surface means of the carrier means. For example, see the French patent to Godel et al, No. 792,144.

SUMMARY OF THE INVENTION

It is one feature of this invention to provide an improved endless power transmission belt construction which is particularly adapted to be utilized for continuously variable transmission purposes and the like.

In particular, it is believed according to the teachings of this invention that the transverse belt element for such an endless power transmission belt construction can comprise a block of polymeric material having a reinforcing member of metallic material disposed therein that not only laterally reinforces the belt element, but also provides a means to interconnect that transverse belt element to a carrier means.

For example, one embodiment of this invention provides an endless power transmission belt construction comprising an endless carrier means having an inner surface means and an outer surface means, and a plurality of transverse belt elements assembled on the carrier means. Each belt element comprises a block of polymeric material having a reinforcing member of metallic material disposed therein. Each reinforcing member comprises a folded blank defining two spaced apart side parts that extend outboard of one of the surface means of the carrier means and an elbow means joining the side parts together and extending outboard of the other of the surface means of the carrier means.

Each belt element has a slot means receiving the carrier means therein and a shoulder means that defines part of the slot means and engages the inner surface means of the carrier means. The side parts of each reinforcing member of each belt element define the shoulder means of their respective belt element.

Accordingly, it is an object of this invention to provide an improved power transmission belt construction having one or more of the novel features of this invention as set forth above or hereinafter shown or described.

Another object of this invention is to provide an improved method of making such a power transmission belt construction, the method of this invention having one or more of the novel features of this invention as set forth above or hereinafter shown or described.

Another object of this invention is to provide an improved transverse belt element for such a power transmission belt construction or the like, the transverse belt element of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing an endless power transmission belt construction particularly adapted to be utilized for continuously variable transmission purposes, it is to be understood that the various features of this invention can be utilized singly or in any combination thereof to provide a belt construction for other uses as desired.

Therefore, this invention is not to be limited to only the embodiments illustrated in the drawings, because the drawings are merely utilized to illustrate one of the wide variety of uses of this invention.

Figure 1:
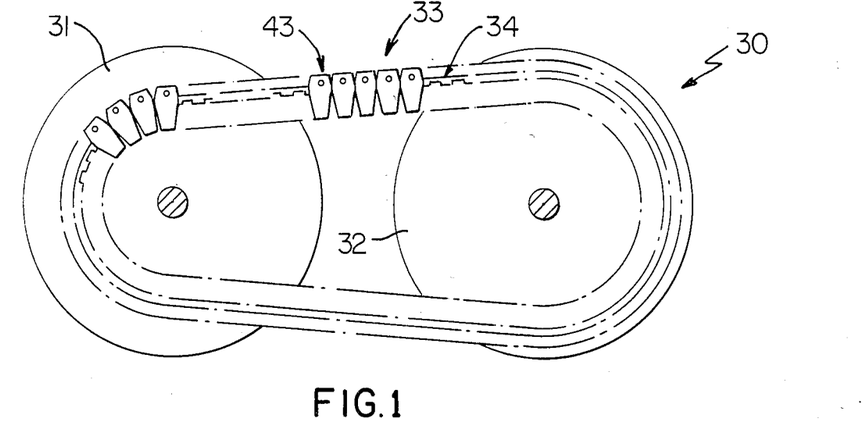
FIG. 1 is a schematic side view of a transmission means that includes one of the improved endless power transmission belt constructions of this invention.

Referring now to FIG. 1, a conventional continuously variable transmission arrangement is generally indicated by the reference numeral 30 and comprises a pair of rotatable pulleys 31 and 32, one of which is to be driven by the other thereof by means of an endless power transmission belt construction of this invention that is generally indicated by the reference numeral 33 and which operates in a manner conventional in the art. The pulleys 31 and 32 have variable diameters in a manner well known in the art whereby a continuously variable transmission is provided by the arrangement 30 in a manner well known in the art and as set forth in the U.S. Pat. No. 4,080,841, to Vollers; the U.S. Pat. No. 4,313,730 to Cole, Jr., et al, and the Swiss Patent No. 256,918 whereby these two U.S. patents and this Swiss patent are being incorporated into this disclosure by this reference thereto.

Since the operation of a continuously variable power transmission arrangement is well known in the art, a further description of the arrangement 30 need not be set forth as the features of this invention are directed to the endless power transmission belt construction 33 and will now be described.

Figure 3:
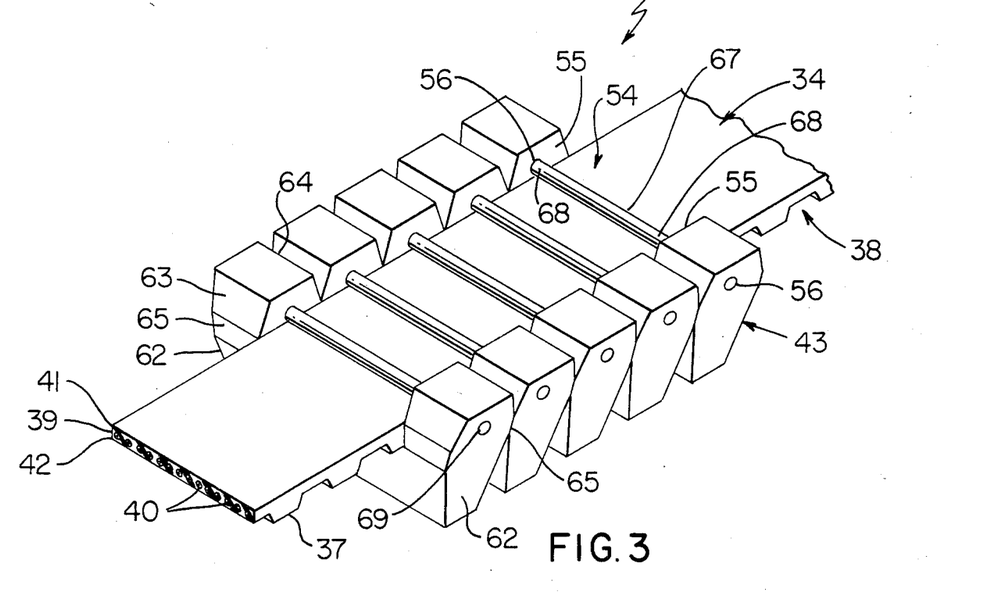
FIG. 3 is a fragmentary top perspective view of the belt construction of FIG. 2.

The endless power transmission belt construction 33 of this invention comprises an endless carrier means 34 having an inner surface means 35 and an outer surface means 36 and can be formed in the manner of a conventional timing or synchronous belt wherein the inside surface means 35 thereof comprises a plurality of teeth-like projections 37 that extend along the longitudinal length of the carrier means 34 and are spaced from each other by suitably shaped recesses 38. The carrier means 34 can be substantially wide as illustrated in FIG. 3 and have a load carrying section 39 comprising a plurality of cords 40 in a manner conventional in the art and being disposed intermediate an outer tension section 41 and an inner compression section 42 in a manner conventional in the art.

The endless carrier means 34 can be formed of any suitable polymeric material and the cords 40 can be formed of any suitable material, such as polymeric material, metallic material, etc. as is conventional in the art.

The endless power transmission belt construction 33 of this invention includes a plurality of transverse belt elements that are each generally indicated by the reference numeral 43 and are assembled on the carrier means 34 in a manner hereinafter set forth. Each transverse belt element 43 comprises a block of polymeric material 44 having a reinforcing member 45 of metallic material disposed therein, such as by having the polymeric material 44 molded or cast onto its respective reinforcing member 45.

While the polymeric material 44 of each transverse belt element 43 can comprise any suitable polymeric material, such as rubber, polyurethane, nylon, phenolic, etc., the same can comprise any one of the polymeric materials set forth in the copending patent application, Ser. No. 501,357 filed June 6, 1983 of Joseph P. Miranti, Jr. et al whereby this copending patent application is being incorporated into this disclosure by this reference thereto.

Also, the reinforcing member 45 for each transverse belt element 43 can be formed of any suitable metallic material, such as steel, aluminum, etc. and can be formed from a flat blank of such material that is generally indicated by the reference numeral 46 in FIG. 8 and which has been stamped and cut into the configuration illustrated in FIG. 8 so as to be subsequently folded into the condition illustrated in FIG. 9 before the polymeric material 44 is cast or molded about the same.

Figure 9:
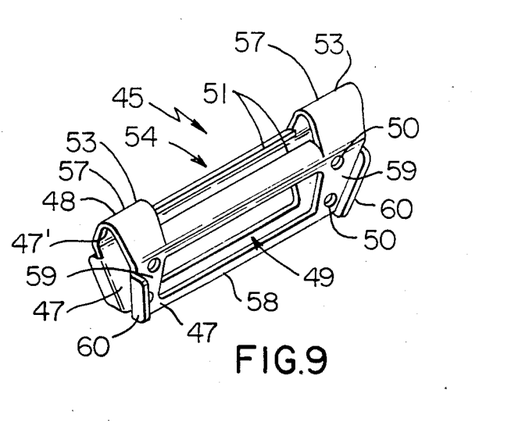
FIG. 9 is a perspective view illustrating the blank of FIG. 8 in its folded configuration.

It can be seen in FIG. 9 that the blank 46 has been folded into a shape to define two spaced apart side parts 47 and an elbow means 48 joining the side parts 47 together.

Figure 2:
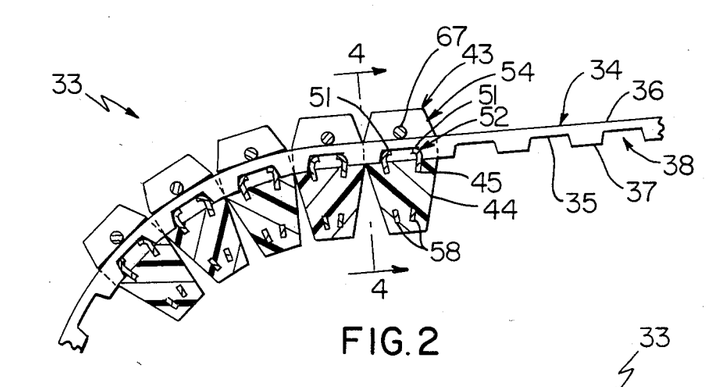
FIG. 2 is an enlarged, fragmentary cross-sectional view of a portion of the endless power transmission belt construction of FIG. 1.
Figure 8:
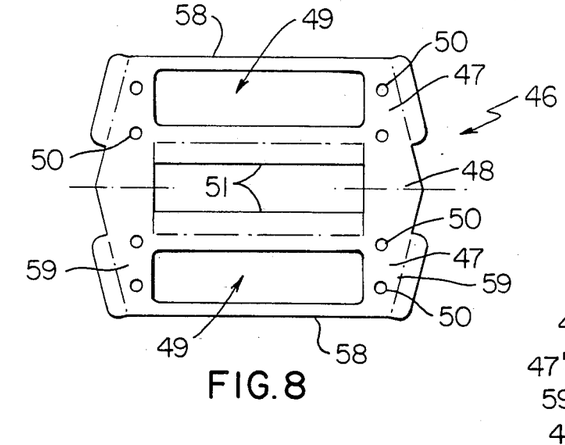
FIG. 8 is a plan view of a blank of material that is subsequently folded and provides a reinforcing member for one of the belt elements of FIGS. 1-6 or 7.

In the embodiment illustrated in FIGS. 8 and 9, the reinforcing member 45 has weight reducing openings 49 formed in the side parts 47 thereof as well as suitable apertures 50 passing through the side parts 47 whereby the openings 49 and apertures 50 provide means for interlocking the polymeric material 44 thereto as illustrated in FIG. 2.

Figure 6:
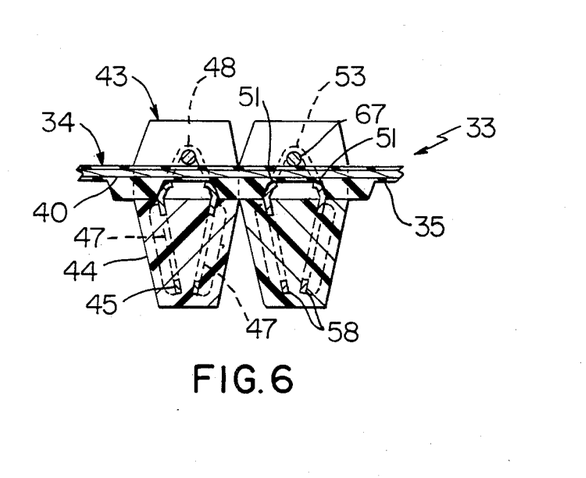
FIG. 6 is a fragmentary cross-sectional view taken on line 6—6 of FIG. 4.
Figure 7:
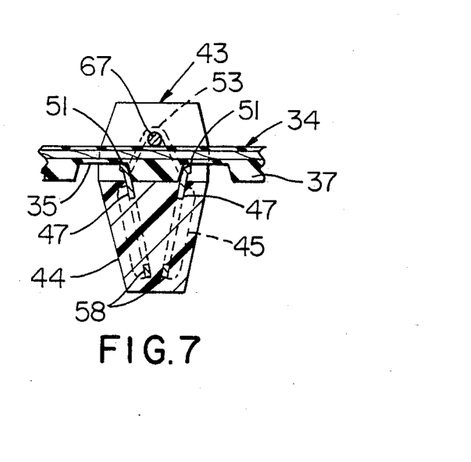
FIG. 7 is a view similar to FIG. 6 and illustrates another belt construction of this invention.

The side parts 47 of the reinforcing member 45 each has an upper end 51 that comprises a flange that can be bent out of the plane of the particular side part 47 either toward the adjacent flange 51 as illustrated in FIGS. 2 and 6 or outwardly away from the same as illustrated in FIG. 7 for a purpose hereinafter described. In any event, the bent or turned flanges 51 of the reinforcing member 45 define shoulder means for the particular belt element 43 thereof which is adapted to engage against the inner surface means 35 of the carrier means 34 when the belt element 43 is assembled thereto in a manner hereinafter set forth, the shoulder means of each belt element 43 being generally indicated by the reference numeral 52 in FIG. 2 and comprise the flanges 51 as previously described.

The elbow means 48 of each reinforcing member 45 comprises two spaced apart elbow portions 53 that are disposed on opposite sides of a slot means that is generally indicated by the reference numeral 54 in FIGS. 2 and 9 and which is adapted to receive the carrier means 34 therein when the respective transverse belt element 43 is assembled to the carrier means 34 as illustrated in FIGS. 2 and 3, the polymeric material 44 of the respective belt element 43 completely embedding the elbow portions 53 therein and defining the slot means 54 between facing surfaces 55 that have suitable openings 56 formed therethrough and leading to beneath the apexes 57 of the elbow portions 53 for a purpose hereinafter described.

Figure 5:
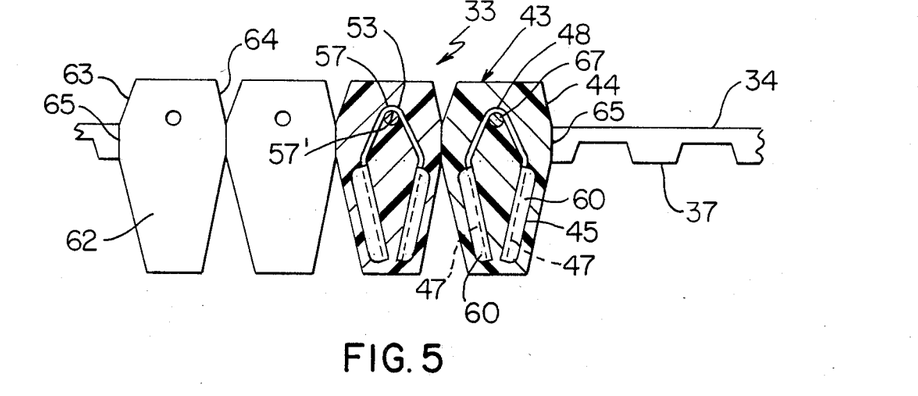
FIG. 5 is a fragmentary cross-sectional view taken on line 5—5 of FIG. 4.
Figure 10:
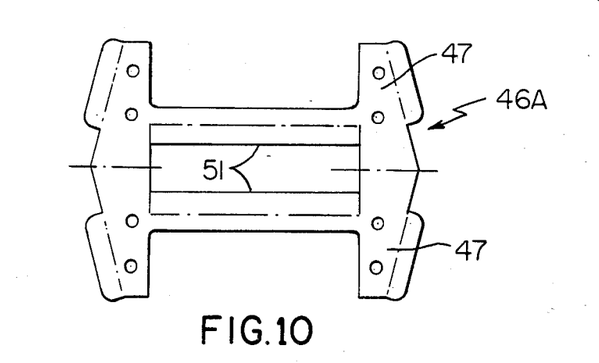
FIG. 10 is a view similar to FIG. 8 and illustrates another blank of this invention.
Figure 11:
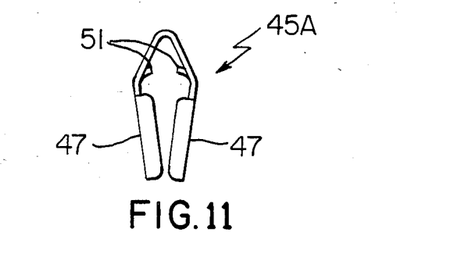
FIG. 11 is an end view of the blank of FIG. 10 in its folded condition.

Each side part 47 of the reinforcing member 45 has a bottom portion 58 opposite to the top flange 51 thereof and has a pair of opposed ends 59 which can be suitably bent to define flanges 60, the flanges 60 of the respective reinforcing member 45 being turned outwardly relative to each other as illustrated in FIG. 5 or turned toward each other as illustrated in FIG. 11. In any event, the flanges 60 provide reinforcing structure within the block of material 44 as illustrated. In addition, the lower surfaces 58 of the side parts 47 of each reinforcing member 45 can be provided with flanges 61 which can be turned transverse to the respective side part 47 in the manner illustrated in FIGS. 12 and 13 for additional reinforcing purposes in the block of material 44 as desired. Alternately, the bottom portion 58 of each side part 47 of the reinforcing member 45 could be completely removed therefrom during the blank forming operation as illustrated in FIG. 10. Similarly, the end flanges 60 could be eliminated from the reinforcing member 45 when the blank of material is being formed, such as in the manner illustrated in FIG. 14.

Figure 12:
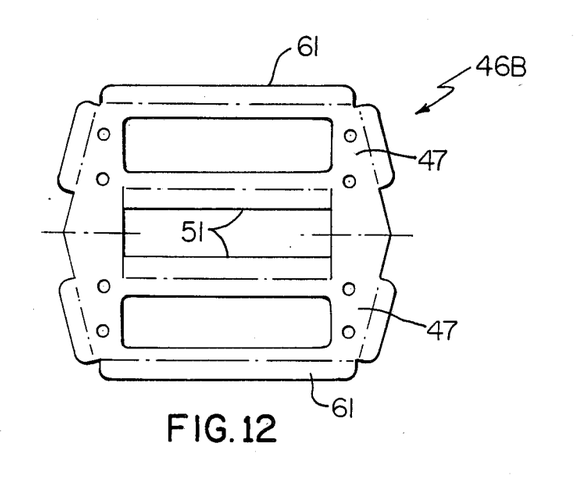
FIG. 12 is a view similar to FIG. 8 and illustrates another blank of this invention.
Figure 13:
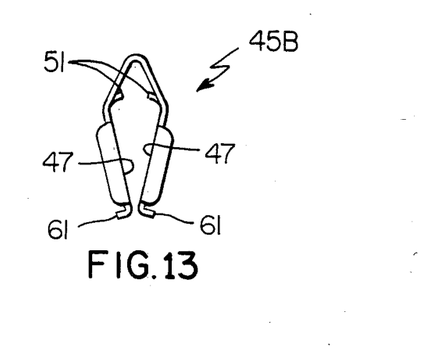
FIG. 13 is an end view of the blank of FIG. 12 in its folded condition.
Figure 14:
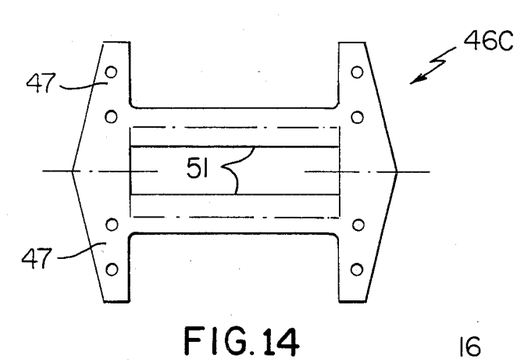
FIG. 14 is a view similar to FIG. 8 and illustrates another blank of this invention.
Figure 15:
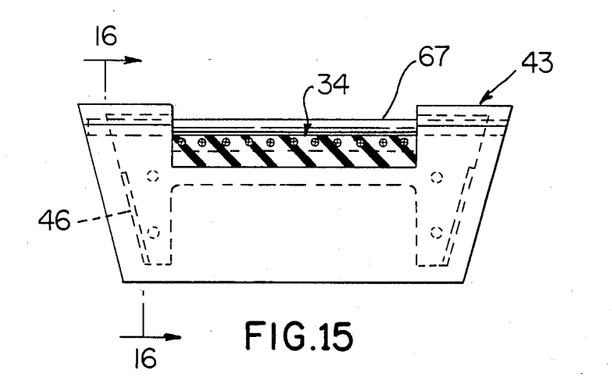
FIG. 15 is a view similar to FIG. 4 and illustrates the belt construction made from the blank of FIG. 10.

In any event, it can be seen that each blank 46 of FIG. 8, 46A of FIG. 10, 46B of FIG. 12 and 46C of FIG. 14 has the side parts 47 thereof formed with the flange means 51 for subsequently forming the shoulder means 52 of the resulting transverse belt element as will be apparent hereinafter whereby each embodiment of this invention will hereinafter be described with like reference numerals indicating like parts.

Figure 4:
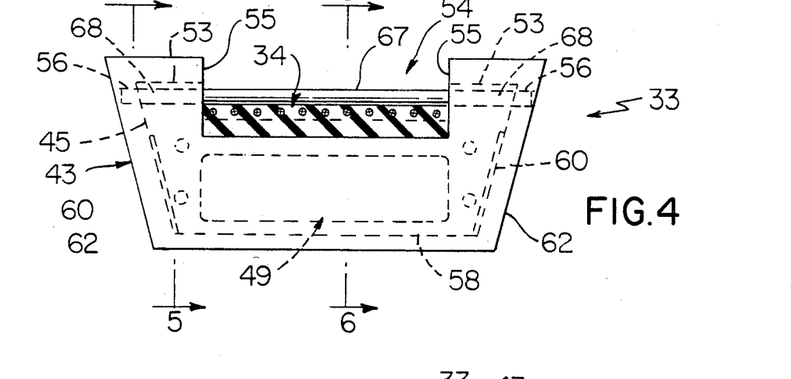
FIG. 4 is an enlarged cross-sectional view of one of the belt constructions of FIG. 2 and is taken on line 4—4 of FIG. 2.

When the polymeric material 44 is being molded about the particular reinforcing member 45, the resulting block of material 44 will be provided with opposed angled flat sides 62 as illustrated in FIG. 4 for engaging against the angled sides of the pulleys 31 and 32 in a conventional manner for driving or being driven by the same in a conventional manner.

Also, when the block of material 44 is being molded or cast, the same will be provided with suitably profiled front and rear faces as indicated by the reference numerals 63 and 64 in FIG. 5, the face 63 being a front face if the belt construction 33 of FIG. 5 is moving from right to left in FIG. 5 and the face 64 being a front face if the belt construction 33 of FIG. 5 is moving from left to right, whereby the faces 63 and 64 are suitably shaped to permit the transverse belt elements 43 to engage against each other with flat parallel portions 65 thereof adjacent the carrier means 34 while permitting the same to pass around the diameters of the pulleys 31 and 32 in the manner illustrated in FIGS. 1 and 2 because the upper portions of the surfaces 63 and 64 define a trapezoidal configuration with the larger base thereof adjacent the carrier means 34 and the lower portions of the surfaces 63 and 64 define a trapezoidal structure below the carrier means 34 wherein the larger base thereof is adjacent the carrier means 34.

Figure 16:
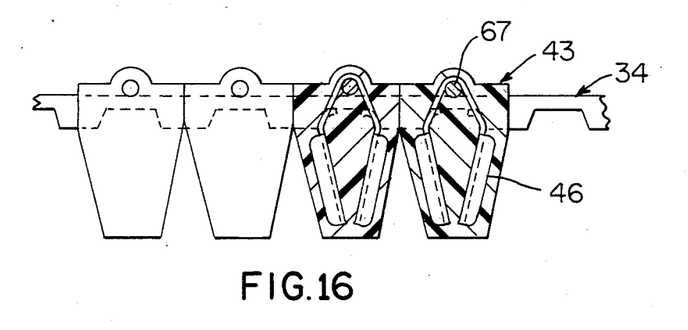
FIG. 16 is a fragmentary cross-sectional view taken on line 16—16 of FIG. 15.
Figure 17:
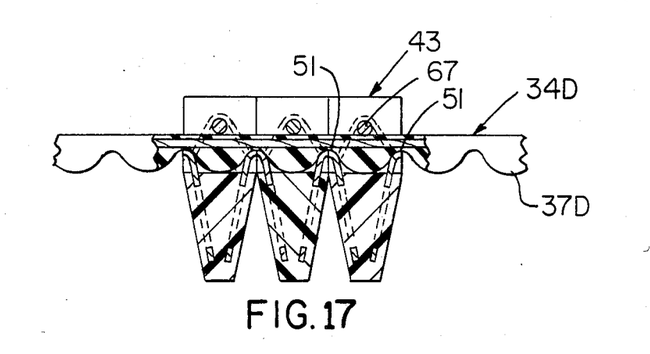
FIG. 17 is a view similar to FIG. 16 and illustrates another belt construction of this invention.
Figure 18:
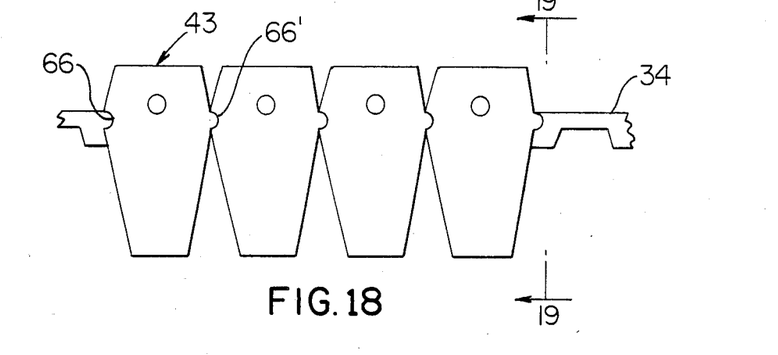
FIG. 18 is a fragmentary side view similar to FIG. 16 and illustrates another belt construction of this invention.
Figure 19:
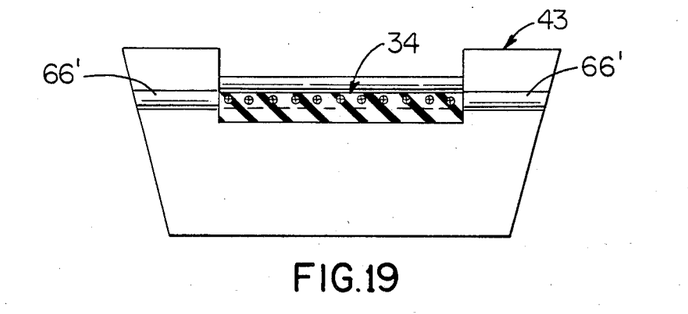
FIG. 19 is a view similar to FIG. 15 and is taken on line 19—19 of FIG. 18.
Figure 20:
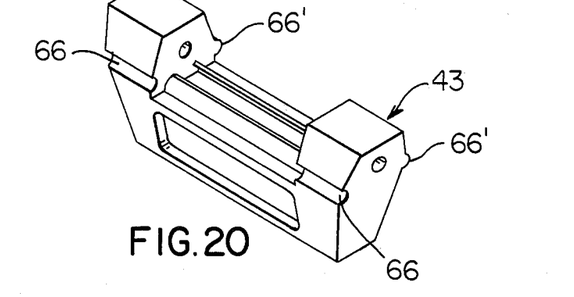
FIG. 20 is a perspective view of the belt element of FIG. 19.

However, it is to be understood that the upper portions of the transverse belt elements 43 could define substantially rectangular portions as illustrated in FIGS. 16 and 17 and such surfaces could also be provided with groove means and rib means that will cooperate together in the manner illustrated in FIGS. 18-20 wherein the groove means 66 are adapted to receive the rib means 66' therein adjacent the carrier means 34 in a manner conventional in the art.

When it is desired to interconnect the transverse belt elements 43 of this invention to the carrier means 34, each belt element 43 is assembled to the carrier means 34 by having the shoulder means 52 thereof being received in a recess 38 disposed between adjacent teeth 37 in the manner illustrated in FIGS. 2 and 6 so that the shoulder means 52 engages against the inner surface means 35 of the carrier means 34. Thereafter, a transverse pin 67, formed of metal or the like, has its opposed ends 68 respectively disposed in the openings 56 that are formed in the facing sides 55 of the block of material 44 as illustrated in FIG. 3 such as by pushing the same through cooperating openings 69 formed in the outer faces 62 of the belt elements 45 as illustrated in FIG. 3 whereby the respective pin 67 is disposed over the carrier means 34 adjacent the outer surface means 36 thereof to hold the respective belt element 43 on the carrier means 34. If desired, the pin 67 can be held in the block of material 44 in such a manner that the same cannot be readily removed therefrom, such as by press-fitting, adhesive means, etc., the opposed ends 68 of the pin 67 respectively being disposed against the inside surfaces 57' of the apexes 57 of the elbow portions 53 as illustrated in FIGS. 4 and 5.

Thus, it can be seen that is is a relatively simple method of this invention to make the belt construction 33 of this invention by securing the transverse belt elements 43 onto the carrier means 34 with the transverse pins 67 so that the carrier means 34 is disposed and confined in the resulting slot means 54 of each belt element 43, each transverse belt element 43 being secured between adjacent teeth 37 whereby the flanges 51 transmit their load to the teeth 37 during the operation of the belt construction 33 in the system 30 in a manner conventional in the art.

However, should it be desired to interconnect each transverse belt element 43 to the carrier means 34 so that a projection or tooth 37 of the carrier means 34 is received between the flanges 51 of the belt element 43, the flanges 51 are turned outwardly in the manner illustrated in FIG. 7 so that the tooth or projection 37 is received therebetween in the manner illustrated in FIG.

7 to interconnect that transverse belt element 43 to the carrier means 34.

Also, it is to be understood that while the carrier means 34 has substantially trapezoidal shaped teeth 37, the teeth 37 could be rounded or formed in any other desired shape.

For example, reference is now made to FIG. 17 wherein the carrier means 34D has rounded projections 37D and the flanges 51 of each transverse belt element 43 are so bent that the same are adapted to receive one of the rounded teeth 37D therein as illustrated in FIG. 17.

Accordingly, it is to be understood that further modifications can be made in the shape of the belt elements 43 such as by reducing the amount of material disposed above the carrier means 34 in the manner illustrated in FIG. 16.

Therefore, it can be seen that the resulting endless power transmission belt construction of this invention has a plurality of transverse belt elements 43 assembled on the carrier means 34 with each belt element comprising a block of polymeric material having a reinforcing member of metallic material therein and comprising a folded blank defining two spaced apart side parts that provide lateral stiffness to the respective belt element while defining shoulder means that engage the inner surface means of the carrier means while the elbow means thereof provides means for receiving a transverse pin that holds the respective belt element on the carrier means.

While the carrier means 34 has been previously described as having projections 37, it is to be understood that the carrier means 34 could be completely flat on both the top and bottom thereof so that the belt elements 43 of this invention will be pusher-type belt elements that are conventional in continuously variable transmission constructions.

Figure 21:
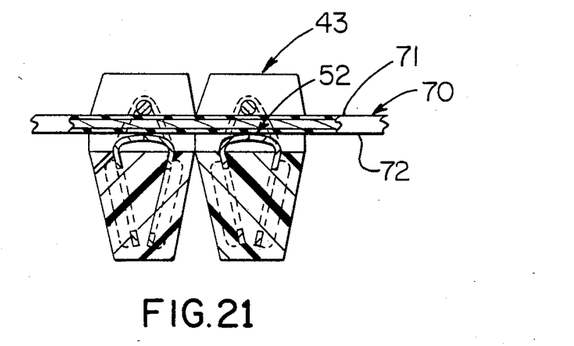
FIG. 21 is a view similar to FIG. 17 and illustrates another belt construction of this invention.

For example, reference is now made to FIG. 21 wherein a carrier means 70 is illustrated as having flat outer surface means 71 and flat inner surface means 72 parallel to the outer surface means 71 with the belt elements 43 being assembled thereon so that the shoulder means 52 engage against the inner surface means 72 of the carrier means 70 whereby the belt elements 43 are adapted to shift longitudinally relative to the carrier means 70 rather than be fixed thereto, such as by the projections 37 previously described.

Therefore, it can be seen that this invention not only provides an improved endless power transmission belt construction and method of making the same, but also this invention provides improved transverse belt elements for such a belt construction or the like.

While the forms and methods of this invention now preferred have been illustrated and described as required by the Patent Statute, it is to be understood that other forms and method steps can be utilized and still fall within the scope of the appended claims.

What is claimed is:

1. In an endless power transmission belt construction comprising an endless carrier means having an inner surface means and an outer surface means, and a plurality of transverse belt elements assembled on said carrier means, each said belt element comprising a block of polymeric material having a reinforcing member of metallic material disposed therein, each said reinforcing member comprising a folded blank defining two spaced apart side parts that extend outboard of one of said surface means of said carrier means and an elbow means joining said side parts together and extending outboard of the other of said surface means of said carrier means, each said belt element having a slot means receiving said carrier means therein and a shoulder means that defines part of said slot means and engages said inner surface means of said carrier means, the improvement wherein said side parts of each said reinforcing member of each said belt element define said shoulder means of their respective belt element.

2. In an endless power transmission belt construction comprising an endless carrier means having an inner surface means and an outer surface means, and a plurality of transverse belt elements assembled on said carrier means, each said belt element comprising a block of polymeric material having a reinforcing member of metallic material disposed therein, the improvement wherein each said reinforcing member comprises a folded blank defining two spaced apart side parts that extend below said inner surface means of said carrier means and an elbow means joining said side parts together and extending above said outer surface means of said carrier means, each said belt element having a slot means receiving said carrier means therein and a shoulder means that defines part of said slot means and engages said inner surface means of said carrier means, said side parts of each said reinforcing member of each said belt element defining said shoulder means of their respective belt element.

3. A belt construction as set forth in claim 2 wherein each side part of each reinforcing member has a flange turned relative to that respective side part and defining part of said shoulder means of its respective belt element.

4. A belt construction as set forth in claim 3 wherein said flanges of each belt element are turned toward each other.

5. A belt construction as set forth in claim 4 wherein said inner surface means of said carrier means has a plurality of longitudinally spaced apart projections extending along the length thereof with each pair of adjacent projections defining a recess therebetween, said flanges of each belt element being disposed in one of said recesses of said carrier means to interconnect the respective belt element to said carrier means.

6. A belt construction as set forth in claim 3 wherein said flanges of each belt element are turned away from each other.

7. A belt construction as set forth in claim 6 wherein said inner surface means of said carrier means has a plurality of longitudinally spaced apart projections extending along the length thereof with each pair of adjacent projections defining a recess therebetween, each said belt element receiving one of said projections between said flanges thereof to interconnect that belt element to said carrier means.

8. A belt construction as set forth in claim 2 wherein each said elbow means of each said belt element comprises two spaced apart elbow portions disposed on opposite sides of said slot means thereof, each said belt element having a pin provided with opposed ends respectively received in said elbow portions thereof and extending across said carrier means adjacent said outer surface means thereof.

9. A belt construction as set forth in claim 2 wherein each side part of each said belt element has opposed ends disposed on opposite sides of said carrier means and comprising flanges that are turned substantially transverse to their respective side part.

10. A belt construction as set forth in claim 2 wherein each side part of each said belt element has a free end spaced from said shoulder means and comprising a flange that is turned substantially transverse to its respective side part.

11. In a method of making an endless power transmission belt construction comprising an endless carrier means having an inner surface means and an outer surface means and a plurality of transverse belt elements assembled on said carrier means, said method comprising the steps of forming each said belt element to comprise a block of polymeric material having a reinforcing member of metallic material disposed therein, forming each said reinforcing member to comprise a folded blank defining two spaced apart side parts that extend outboard of one of said surface means of said carrier means and an elbow means joining said side parts together and extending outboard of the other of said surface means of said carrier means, and forming each said belt element to have a slot means receiving said carrier means therein and a shoulder means that defines part of said slot means and engages said inner surface means of said carrier means, the improvement comprising the step of forming said side parts of each said reinforcing member of each said belt element to define said shoulder means of their respective belt element.

12. In a method of making an endless power transmission belt construction comprising an endless carrier means having an inner surface means and an outer surface means and a plurality of transverse belt elements assembled on said carrier means, said method comprising the step of forming each said belt element to comprise a block of polymeric material having a reinforcing member of metallic material disposed therein, the improvement comprising the steps of forming each said reinforcing member to comprise a folded blank defining two spaced apart side parts that extend below said inner surface means of said carrier means and an elbow means joining said side parts together and extending above said outer surface means of said carrier means, forming each said belt element to have a slot means receiving said carrier means therein and a shoulder means that defines part of said slot means and engages said inner surface means of said carrier means, and forming said side parts of each said reinforcing member of each said belt element to define said shoulder means of their respective belt element.

13. A method of making a belt construction as set forth in claim 12 and including the step of forming each side part of each reinforcing member to have a flange returned relative to that respective side part and defining part of said shoulder means of its respective belt element.

14. A method of making a belt construction as set forth in claim 13 wherein said flanges of each belt element are turned toward each other.

15. A method of making a belt construction as set forth in claim 14 and including the steps of forming said inner surface means of said carrier means to have a plurality of longitudinally spaced apart projections extending along the length thereof with each pair of adjacent projections defining a recess therebetween, and disposing said flanges of each belt element in one of said recesses of said carrier means to interconnect the respective belt element to said carrier means.

16. A method of making a belt construction as set forth in claim 13 wherein said flanges of each belt element are turned away from each other.

17. A method of making a belt construction as set forth in claim 16 and including the steps of forming said inner surface means of said carrier means to have a plurality of longitudinally spaced apart projections extending along the length thereof with each pair of adjacent projections defining a recess therebetween, and disposing each said belt element so as to receive one of said projections between said flanges thereof to interconnect that belt element to said carrier means.

18. A method of making a belt construction as set forth in claim 12 and including the steps of forming each said elbow means of each said belt element to comprise two spaced apart elbow portions disposed on opposite sides of said slot means thereof, and forming each said belt element to have a pin provided with opposed ends respectively received in said elbow portions thereof and extending across said carrier means adjacent said outer surface means thereof.

19. A method of making a belt construction as set forth in claim 12 and including the steps of forming each side part of each said belt element to have opposed ends disposed on opposite sides of said carrier means, and forming said ends of each said side part to comprise flanges that are turned substantially transverse to their respective side part.

20. A method of making a belt construction as set forth in claim 12 and including the steps of forming each side part of each said belt element to have a free end spaced from said shoulder means, and forming said free end of each said side part to comprise a flange that is turned substantially transverse to its respective side part.

21. In a transverse belt element for an endless power transmission belt construction that comprises an endless carrier means having an inner surface means and an outer surface means and a plurality of said transverse belt elements assembled on said carrier means, said belt element comprising a block of polymeric material having a reinforcing member of metallic material disposed therein, said reinforcing member comprising a folded blank defining two spaced apart side parts that are adapted to extend outboard of one of said surface means of said carrier means and an elbow means joining said side parts together and adapted to extend outboard of the other of said surface means of said carrier means, said belt element having a slot means adapted to receive said carrier means therein and a shoulder means that defines part of said slot means thereof and is adapted to engage said inner surface means of said carrier means, the improvement wherein said side parts of said reinforcing member of said belt element define said shoulder means of said belt element.

22. In a transverse belt element for an endless power transmission belt construction that comprises an endless carrier means having an inner surface means and an outer surface means and a plurality of said transverse belt elements assembled on said carrier means, said belt element comprising a block of polymeric material having a reinforcing member of metallic material disposed therein, the improvement wherein said reinforcing member comprises a folded blank defining two spaced apart side parts that are adapted to extend below said inner surface means of said carrier means and an elbow means joining said side parts together and adapted to extend above said outer surface means of said carrier means, said belt element having a slot means adapted to receive said carrier means therein and a shoulder means that defines part of said slot means thereof and is adapted to engage said inner surface means of said carrier means, said side parts of said reinforcing member of said belt element defining said shoulder means of said belt element.

23. A belt element as set forth in claim 22 wherein each side part of said reinforcing member has a flange turned relative to that respective side part and defining part of said shoulder means of said belt element.

24. A belt element as set forth in claim 23 wherein said flanges of said belt element are turned toward each other.

25. A belt element as set forth in claim 24 wherein said inner surface means of said carrier means has a plurality of longitudinally spaced apart projections extending along the length thereof with each pair of adjacent projections defining a recess therebetween, said flanges of said belt element being adapted to be disposed in one of said recesses of said carrier means to interconnect said belt element to said carrier means.

26. A belt element as set forth in claim 23 wherein said flanges of said belt element are turned away from each other.

27. A belt element as set forth in claim 26 wherein said inner surface means of said carrier means has a plurality of longitudinally spaced apart projections extending along the length thereof with each pair of adjacent projections defining a recess therebetween, said belt element being adapted to receive one of said projections between said flanges thereof to interconnect said belt element to said carrier means.

28. A belt element as set forth in claim 22 wherein said elbow means of said belt element comprises two spaced apart elbow portions disposed on opposite sides of said slot means thereof, said belt element being adapted to have a pin provided with opposed ends respectively received in said elbow portions thereof and extend across said carrier means adjacent said outer surface means thereof.

29. A belt element as set forth in claim 22 wherein each side part of said belt element has opposed ends adapted to be disposed on opposite sides of said carrier means and comprising flanges that are turned substantially transverse to their respective side part.

30. A belt element as set forth in claim 22 wherein each side part of said belt element has a free end spaced from said shoulder means and comprising a flange that is turned substantially transverse to its respective side part.

31. A belt construction as set forth in claim 1 wherein each side part of each reinforcing member has a flange turned relative to that respective side part and defining part of said shoulder means of its respective belt element.

32. A belt construction as set forth in claim 31 wherein said flanges of each belt element are turned toward each other.

33. A belt construction as set forth in claim 32 wherein said inner surface means of said carrier means has a plurality of longitudinally spaced apart projections extending along the length thereof with each pair of adjacent projections defining a recess therebetween, said flanges of each belt element being disposed in one of said recesses of said carrier means to interconnect the respective belt element to said carrier means.

34. A belt construction as set forth in claim 31 wherein said flanges of each belt element are turned away from each other.

35. A belt construction as set forth in claim 34 wherein said inner surface means of said carrier means has a plurality of longitudinally spaced apart projections extending along the length thereof with each pair of adjacent projections defining a recess therebetween, each said belt element receiving one of said projections between said flanges thereof to interconnect that belt element to said carrier means.

36. A belt construction as set forth in claim 1 wherein each side part of each said belt element has opposed ends disposed on opposite sides of said carrier means and comprising flanges that are turned substantially transverse to their respective side part.

37. A belt construction as set forth in claim 1 wherein each side part of each said belt element has a free end spaced from said shoulder means and comprising a flange that is turned substantially transverse to its respective side part.

38. A method of making a belt construction as set forth in claim 11 and including the step of forming each side part of each reinforcing member to have a flange turned relative to that respective side part and defining part of said shoulder means of its respective belt element.

39. A method of making a belt construction as set forth in claim 38 wherein said flanges of each belt element are turned toward each other.

40. A method of making a belt construction as set forth in claim 39 and including the steps of forming said inner surface means of said carrier means to have a plurality of longitudinally spaced apart projections extending along the length thereof with each pair of adjacent projections defining a recess therebetween, and disposing said flanges of each belt element in one of said recesses of said carrier means to interconnect the respective belt element to said carrier means.

41. A method of making a belt construction as set forth in claim 38 wherein said flanges of each belt element are turned away from each other.

42. A method of making a belt construction as set forth in claim 41 and including the steps of forming said inner surface means of said carrier means to have a plurality of longitudinally spaced apart projections extending along the length thereof with each pair of adjacent projections defining a recess therebetween, and disposing each said belt element so as to receive one of said projections between said flanges thereof to interconnect that belt element to said carrier means.

43. A method of making a belt construction as set forth in claim 11 and including the steps of forming each side part of each said belt element to have opposed ends disposed on opposite sides of said carrier means, and forming said ends of each said side part to comprise flanges that are turned substantially transverse to their respective side part.

44. A method of making a belt construction as set forth in claim 11 and including the steps of forming each side part of each said belt element to have a free end spaced from said shoulder means, and forming said free end of each said side part to comprise a flange that is turned substantially transverse to its respective side part.

45. A belt element as set forth in claim 21 wherein each side part of said reinforcing member has a flange turned relative to that respective side part and defining part of said shoulder means of said belt element.

46. A belt element as set forth in claim 45 wherein said flanges of said belt element are turned toward each other.

47. A belt element as set forth in claim 46 wherein said inner surface means of said carrier means has a plurality of longitudinally spaced apart projections extending along the length thereof with each pair of adjacent projections defining a recess therebetween, said flanges of said belt element being adapted to be disposed in one of said recesses of said carrier means to interconnect said belt element to said carrier means.

48. A belt element as set forth in claim 45 wherein said flanges of said belt element are turned away from each other.

49. A belt element as set forth in claim 48 wherein said inner surface means of said carrier means has a plurality of longitudinally spaced apart projections extending along the length thereof with each pair of adjacent projections defining a recess therebetween, said belt element being adapted to receive one of said projections between said flanges thereof to interconnect said belt element to said carrier means.

50. A belt element as set forth in claim 21 wherein each side part of said belt element has opposed ends adapted to be disposed on opposite sides of said carrier means and comprising flanges that are turned substantially transverse to their respective side part.

51. A belt element as set forth in claim 21 wherein each side part of said belt element has a free end spaced from said shoulder means and comprising a flange that is turned substantially transverse to its respective side part.

* * * * *